United States Patent [19]

Cherbuy et al.

[11] Patent Number: 4,831,386

[45] Date of Patent: May 16, 1989

[54] POWDERED SUBSTANCE FOR LUBRICATING THE RECORDING CARRIER OR A MAGNETIC PRINTER

[75] Inventors: Bernard Cherbuy, Belfort; Daniel Kinet, Frahier; Jacques Estavoyer, Bavilliers, all of France

[73] Assignee: Bull S.A., Paris, France

[21] Appl. No.: 191,175

[22] Filed: May 6, 1988

[30] Foreign Application Priority Data

May 7, 1987 [FR] France ................................ 87 06510

[51] Int. Cl.[4] ............................................ G01D 15/00

[52] U.S. Cl. .................................. 346/74.2; 346/74.6

[58] Field of Search .................. 346/74.2, 74.6, 135.1, 346/105, 160.1; 400/119, 241-241.4; 358/301; 101/DIG. 5

[56] References Cited

U.S. PATENT DOCUMENTS 4,477,198 10/1984 Bowlds et al. .................. 400/241.1

FOREIGN PATENT DOCUMENTS 0202480 11/1984 Japan ................................. 346/74.2

*Primary Examiner*—Arthur G. Evans

*Attorney, Agent, or Firm*—Kerkam, Stowell, Kondracki & Clarke

[57] ABSTRACT

The invention relates to a powdered substance for lubricating the recording carrier of a magnetic printer. This solid substance is in the form of a powder comprising groups (G) of particles, each of these groups being formed by one particle (30) of lubricating insulating material surrounded on its periphery by particles (31) of conductive carbon, the number of the latter particles being sufficient to cover the entirety of the external surface of this particle of lubricating insulating material. The invention is applicable to magnetography.

28 Claims, 3 Drawing Sheets

FIG.1
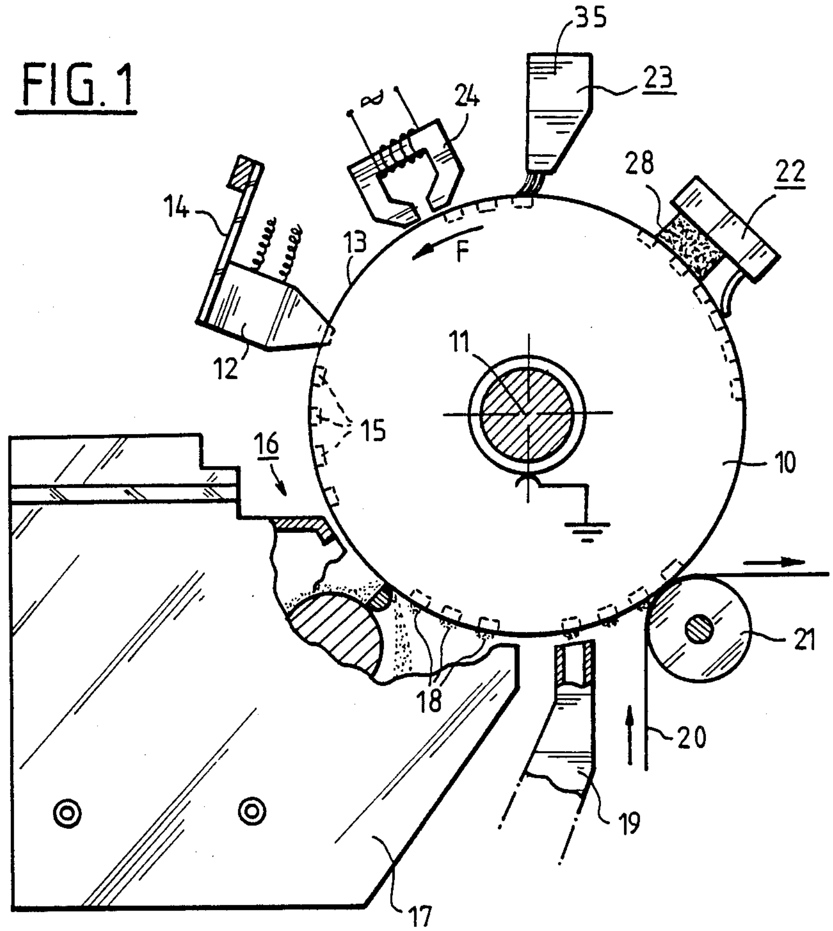
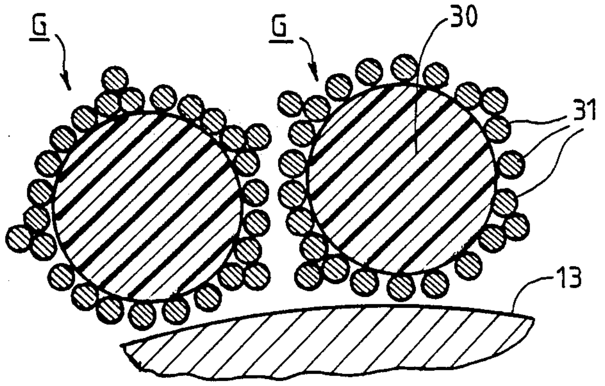
FIG.2

POWDERED SUBSTANCE FOR LUBRICATING THE RECORDING CARRIER OR A MAGNETIC PRINTER

FIELD OF THE INVENTION

The present invention relates to a powdered substance for lubricating the recording carrier of a magnetic printer.

BACKGROUND OF THE INVENTION

In modern information processing equipment, high-speed printers in which the characters are printed without impact of printing type in relief on a receiving sheet of paper are increasingly being used. Magnetographic printers of this generic type similar to those described and shown in French Pat. No. 2.305.764 are already known. In such printers the printing of the characters is formed by first forming a latent magnetic image on the surface of a magnetic recording carrier generally having the shape of a rotating drum or an endless belt, the image being derived from signals received from a control unit. In a known manner, this latent image comprises a set of magnetized zones of very small dimension, virtually punctuate, which are conventionally known as magnetized points.

The latent image thus formed is then developed, or in other words made visible with the aid of a powdered developer, which comprises particles of thermoplastic resin enclosing each of the magnetic particles and so is not attracted except by the magnetized zones of the recording carrier, thus forming an image in powder on the surface of this carrier. After that, this powder image is transferred to the receiving sheet of paper. In order to obtain high-quality printing of the printed characters on the sheet of paper, latent magnetic images of which the various constituent points are very small and very close to one another must be recorded on the magnetic film of the recording carrier. To record these latent images, a recording device known as a transducer is used, which includes a plurality of magnetic heads arranged one beside the other. Each of these heads is formed by a metal core of high magnetic permeability on which a winding is wound; at one of its ends this core has a magnetic pole, known as the writing or recording pole, which is placed in contact with or near the magnetic film such that each time an electric current of suitable intensity is sent through this winding, the current creates a magnetic flux in the core that magnetizes the portion of the magnetic flux located facing the writing pole of the head.

The magnetized points thus formed by the various heads of the transducer must not only be perfectly defined and all have substantially the same size, but they must also have virtually the same intensity of magnetization, in order that each can retain a quantity of developer particles that remains virtually constant from one point to another. To meet these requirements, it is indispensible that the distance that separates each head from the magnetic film remain constant and less than a predetermined limit value. This is why, for example, in the case where the magnetized points formed on the magnetized film each have a square section on the order of about 100 μm on a side and are distributed at a density such that the distance separating two adjacent magnetized points is practically equal to 30 μm, this limit value has been found to equal about 10 μm. Adjusting the heads and the recording carrier to keep this distance as constant as possible has always been a difficult problem to solve and could not be surmounted except by using complex and particularly expensive equipment. For this reason, to avoid having to use such equipment, it has in practice been necessary to put the transducer heads into contact with the magnetic surface of the recording carrier. However, putting the heads into contact with the magnetic surface causes heating upon displacement of the recording carrier, and this effect is all the more pronounced, the higher the speed with which this carrier is driven.

This heating is capable of interfering with or even preventing recording of the information on the carrier. Moreover, it causes the developer particles deposited on the carrier to soften, so that they cannot be completely transferred to the sheet of paper. Over the long term, a film of resin that increases in thickness with time forms on the magnetic film of the carrier, and this film causes the distance between the recording heads and the magnetic film of the carrier, and this film causes the distance between the recording heads and the magnetic film to increase constantly, thus rendering the printing of the characters completely defective.

In order to diminish friction of the heads on the recording carrier and thus to notably reduce the heating caused by this friction, one might think to deposit solid particles of lubricating substance on the magnetic film of the recording carrier, these particles being such as have already been used in the prior art to assure lubrication of the recording surface of electrostatic printing machines. For example, electrostatic printers are known which have been described in Japanese published patent application No. 56.101177, in which the surface of the electrostatic drum is lubricated by applying a strip of fabric, impregnated with solid polyethylene, polytetrafluoroethylene or paraffin wax to this surface.

An electrophotographic copying machine is also known, described in Japanese published patent application No. 57.078578, in which the photoreceptive electrostatic surface is lubricated by depositing on this surface a solid lubricant comprising polyethylene or zinc stearate particles, which is done either directly or by putting a strip of fabric containing these particles into contact with the surface, or by incorporating these lubricant particles with the developer particles intended to be applied to the surface.

However, it has been observed that by depositing particles of lubricating substances already used for lubricating an electrostatic printer recording carrier on the magnetic film of the recording carrier of a magnetic printer, these lubricating particles became charged with static electricity because of the friction they underwent upon passing beneath the transducer, and they were then capable upon passing before the applicator device of the developer of attracting resinous developer particles contained in this device. As a result the developer articles, which were also attracted by the lubricating particles, formed an undesirable film when they were then transferred to the sheet of paper, and this film greatly reduced constrast between the image intended to be printed and the original base of the paper.

SUMMARY OF THE INVENTION

The present invention overcomes these disadvantages proposes a powdered substance which when applied to the surface of the recording carrier of a magnetic printer assures suitable lubrication of this carrier without forming an undesirable film on the sheet of printed paper.

More precisely, the present invention relates to a powdered lubricating substance that can be applied to the external surface of a recording carrier of a magnetic printer, the substance comprising particles of a powdered insulating material capable of reducing friction between said surface and a recording device applied to this surface. The substance further contains particles of conductive carbon which are disposed about the insulating particles to form groups of lubricating particles, and the ratio of the total mass of carbon to that of said insulating material is between 0.2 and 1.

The present invention will better understood and further objects and advantages thereof will become more apparent from the ensuing detailed description given by way of non-limiting example, taken in conjunction with the accompanying drawings.

BRIEF DESCRIPTION OF THE DRAWINGS

FIG. 1 shows a magnetic printing machine equipped with a device permitting deposition of the powdered lubricating substance embodied in accordance with the invention on the magnetic recording carrier;

FIG. 2 shows groups of lubricating particles comprising the powdered lubricating substance of the invention;

DESCRIPTION OF THE PREFERRED EMBODIMENT

Figure 3:
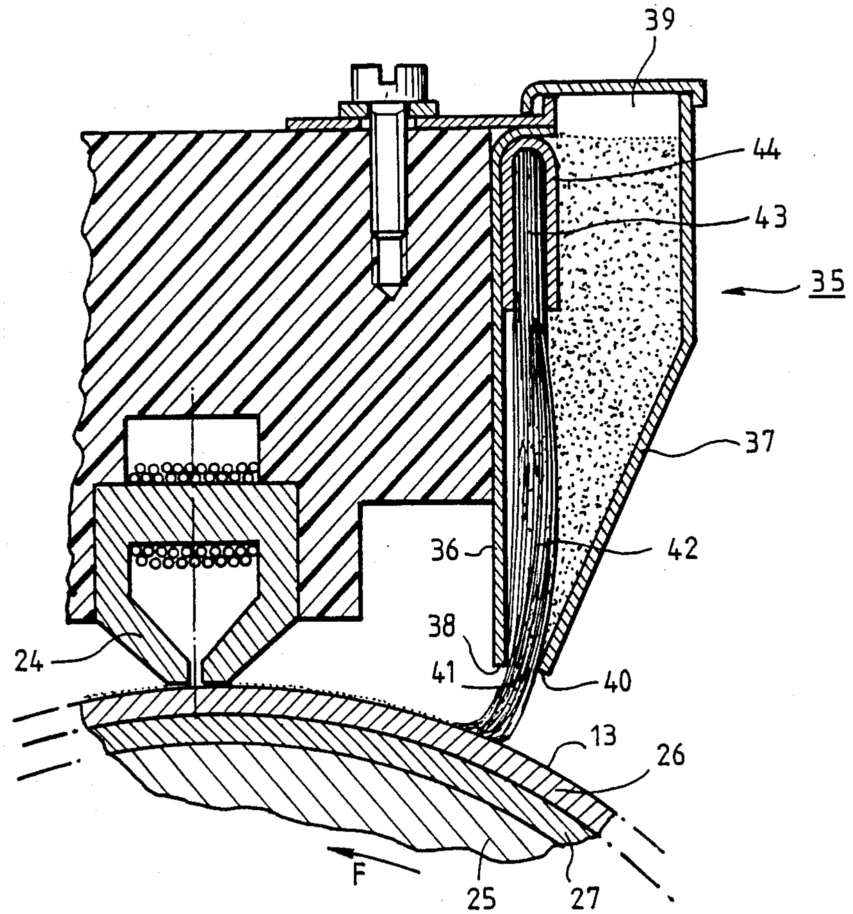
FIG. 3 is a sectional view showing the constitution of an applicator device, which when mounted on a magnetic printer makes it possible to dispose the powdered lubricating substance of the invention regularly over the recording carrier of this printer.

The printing machine, a portion of which is schematically shown in FIG. 1, includes a recording carrier which in the example described comprises a magnetic drum 10. This magnetic drum 10, which is mounted such that it can rotate about a horizontal axis 11, is driven in rotation in the direction indicated by the arrow F by an electric motor (not shown). The recording of information on this drum is accomplished by a magnetic recording device 12, which is kept pressed to the external surface 13 of the drum 10 by the action of a spring 14. This recording device 12 is embodied in a known manner by a set of magnetic recording heads, which are placed one beside the other, aligned in parallel with the axis of rotation 11 of the drum 10. Each of these heads, each time it is excited for a brief instant by an electric current, generates a variable magnetic field, which creates practically punctuate magnetized zones 15 on the surface 13 of the drum rotating past the recording device 12, and the set of thse zones comprises one latent magnetic image corresponding to one character to be printed. These magnetized zones 15 then travel past a developer applicator device 16 which is disposed below the drum 10 and with which particles of a powdered developer contained in a reservoir 17 can be applied to the surface 13 of the drum. This applicator 16 will not be described here, because it is a type similar to what has been described in French published patent application No. 2.408.462. The developer particles there applied by this applicator to the surface 13 of the drum adhere, in principle, only to the magnetized zones of this drum, so that these zones after having traveled past the applicator 16 appear coated with a film of developer, forming deposits 18 on the surface 13 of the drum. These deposits 18 then travel past a retouching device 19, the function of which is to eliminate the developer particles that have adhered anywhere but the magnetized zones 15, as well as the excess particles on these zones. After having traveled past the retouching device 17, the developer particles that remain on the drum are then transferred virtually totally to a sheet of paper 20 which is pressed against the surface 13 of the drum by means of a pressure roller 21. The residual particles of developer still located on the drum 10 once the transfer has been performed are then lifted by means of a pad of felt 28, which is pressed against the surface of the drum and is part of a cleaning device 22. The magnetized zones that have traveled past this cleaning device 22 then travel past a lubricating substance applicator 23, which will be described in further detail below, and then past an erasing device 24, which when excited by an alternating electric current in a known manner assures the erasure of the magnetized zones traveling past it; the portions of the drum thus demagnetized by this erasing device can then be remagnetized when they again move past the recording device 12.

The powdered developer contained in the reservoir 17 of the printer machine shown in FIG. 1 comprises magnetic particles surrounded by a thermoplastic resin, which when heated is capable of melting and becoming affixed to the sheet of paper 20 on which it has been deposited. This melting is normally brought about by a heating device (not shown) which crosses the sheet of paper 20 after its passage between the drum 10 and the pressure roller 21.

Figure 4:
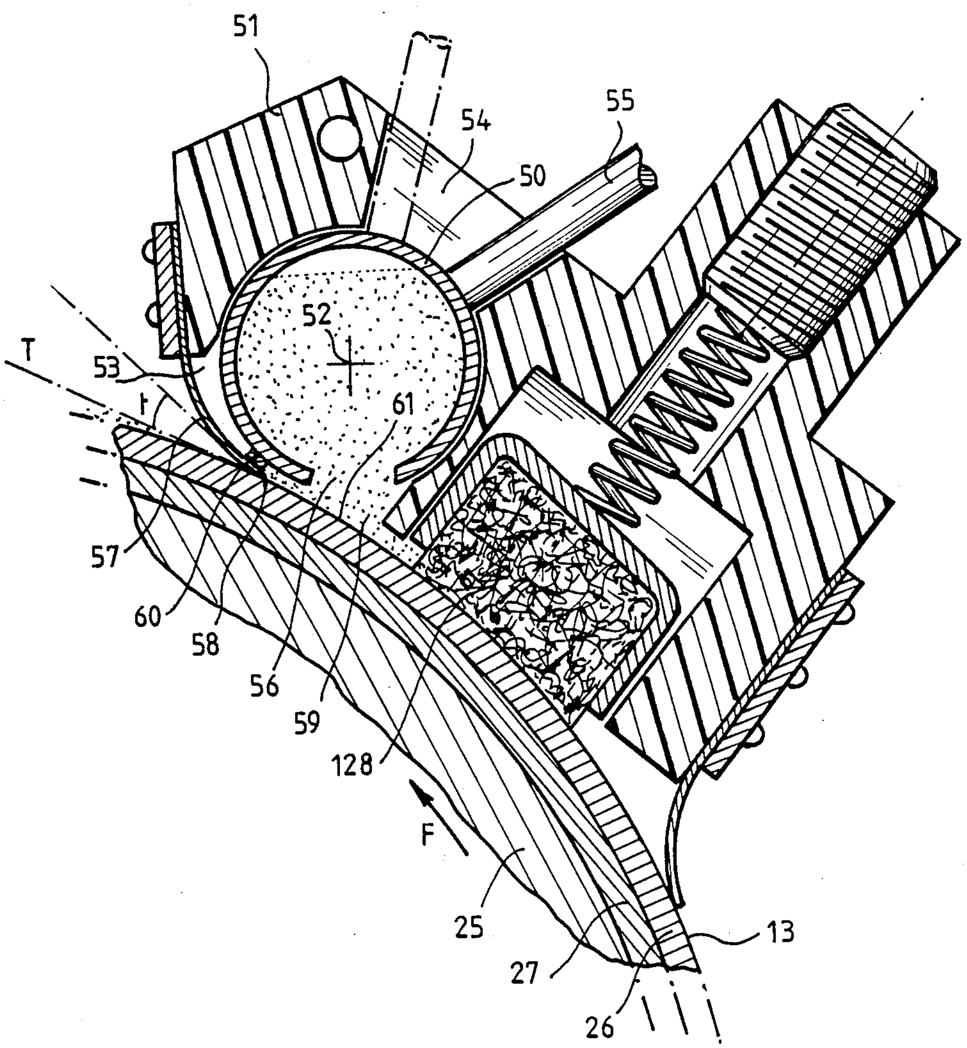
FIG. 4 is a sectional view showing the constitution of another applicator device with which the powdered lubricating substance of the invention can be deposited regularly over the recording carrier of a magnetic printer.

The magnetic drum 10 with which the printing machine shown in FIG. 1 is equipped is of a known structure. This drum 10, a portion of which is schematically shown in FIGS. 3 and 4 is substantially formed by a cylindrical conductive core 25, for example comprising brass or low carbon steel, coated with a layer 26 of magnetic alloy, likewise conductive, for example comprising a nickel-cobaltphosphorus alloy containing approximately 76 to 82% cobalt and from 1 to 2% phosphorus, this layer having a thickness of between approximately 10 and 30 μm. An intermediate conductive layer 27, intended to act as a magnetic shunt and comprising a metal or a soft magnetic alloy such as low carbon steel, may optionally be disposed between the cylindrical core 25 and the magnetic alloy layer 26. The magnetic drum 10 embodied in this way is electrically connected to ground, as shown in FIG. 1, for reasons which will be discussed below.

The recording device 12 which is part of the printer shown in FIG. 1 will not be described in detail, because its structure is similar to that also described in French Pat. No. 2.518.770. However, it will be remembered that the magnetic heads with which this recording device is equipped are positioned such that the ends of the writing poles of these heads come to be flush with a sliding face of this device.

Furthermore, in order to obtain latent magnetic images on the magnetic film of the drum 10 that are capable of reproducing high-resolution, perfectly sharp printed characters on the sheet of paper 20, this sliding face is pressed permanently against the surface 13 of the drum 10, by the action of the spring 14. Moreover, in order to permit correct erasure of the latent magnetic images formed by this recording device, the recording device 24 is preferably mounted on an elastic device of known type (not shown), which keeps it constantly pressed against the surface 13 of the drum. Although the surface areas of the recording device and of the erasure device which are thus located permanently in contact with the drum 10 are relatively reduced, it will be understood that the friction exerted by these surfaces upon rotation of the drum are the source of heating, which is the more pronounced, the greater the coefficient of friction of the surfaces thus placed in contact, and the higher the speed of rotation of the drum. If the surface 13 of the drum were not lubricated correctly, this heating could attain such a value that not only would the recording of latent images on the drum be interfered with greatly, but also the developer particles deposited on the surface of the drum would undergo such softening that they would adhere to this surface and form a tenacious covering film, which being very difficult to remove, would cause the immediate stoppage of the work in progress.

Because of the deposition on the surface 13 of the drum of a lubricating substance contained in the applicator 23, these disadvantages are eliminated. This lubricating substance comprises particles of a powdered, dry insulating material of a known type, capable of reducing the friction exerted upon the rotation of the drum 10 by the surfaces of the recording device and erasure device which are in contact with the surface of the drum. This dry powdered lubricating and insulating material may be comprised of molybdenum bisulfide, or a metal salt of saturated, unsaturated or partially substituted fatty acid. Hence the metal salt may derive from one of the fatty acids such as caproic acid, caprylic acid, capric acid, lauric acid, myristic acid, palmitic acid, stearic acid, arachidic acid, behenic acid, oenanthylic acid, pelargonic acid, undecylic acid, tridecylic acid, pentadecylic acid, margaric acid, nonadecylic acid, tricosanic acid, undecylenic acid, oleic acid, linoleic acid, linolenic acid, oleostearic acid, arachidonic acid, petroselinic acid, vaccenic acid, gadoleic acid, palmitolic acid, cetooleic acid, ricinoleic acid, as well as mixtures of these acids. The metal salts that are the most suitable belong to the group including the stearates of barrium, calcium, strontium, cadmium, magnesium, zinc, copper, lead, iron, cobalt and nickel; the palmitates of calcium, zinc, copper, aluminum, magnesium and cobalt; the oleates of magnesium, zinc, copper, lead, manganese, iron and cobalt; lead caprylate; lead caproate; the linoleates of calcium, zinc and cobalt; and the ricinoleates of zinc and cadmium.

The dry lubricating and insulating material may also comprise fine particles of polytetrafluoroethylene.

It should now be noted that the dry lubricating and insulating material the nature of which will be described in more detail below is always of fine granulometry, and the size of the particles comprising this material is in fact on the order of 1 μm. Moreover, according to the present invention, this powdered material, prior to being applied to the surface of the drum 10, is mixed with very fine particles of conductive carbon, the size of these carbon particles being approximately 100 times smaller than that of the particles of insulating material, or in other words on the order of 0.01 μm. The quantity of powdered carbon that is thus added to the powdered lubricating and insulating material is such that the total mass of carbon added is still between 0.2M and 1M, where M is the mass of lubricating insulating material. Thus the powdered lubricating substance which must be applied to the surface of the drum may be obtained, for example, by taking 100 g of powdered polytetrafluoroehtylene, on the one hand, a quantity of powdered conductive carbon included between 20 and 100 g, on the other hand, and by carefully mixing these two products with the aid of a high-speed mixture of a known type. The resultant powdered mixture comprises groups of particles of the type shown and designated by G in FIG. 2, each of these groups being formed, as this drawing figure shows, by a single particle 30 of lubricating insulating material (for example, polytetrafluoroethylene), surrounded on its periphery by particles 31 of conductive carbon. In FIG. 2, the particles 30 and 31 have not been shown to scale, for obvious reasons of clarity in the drawing. The number of particles of carbon 31 that surround the same particle of insulating material depend on the proportion of carbon contained in the powdered lubricating substance, but if the mixture of lubricating insulating substance and powdered conductive carbon has been carefully accomplished, this number remains practically constant from one insulating particle 30 to the next. It should also be noted that even in the case where the quantity of carbon that has been added is relatively slight, that is, equal to 0.2 times the mass of the lubricating insulating material, the number of particles of carbon 31 that surround the same insulating particle 30 is sufficiently high that these carbon particles, which are distributed evenly over the external surface of this insulating particle, cover the entirety of this surface.

The powdered lubricating substance, which is embodied by groups of particles G the constitution of which has just been described above, is distributed uniformly over the external surface 13 of the magnetic drum 10 by means of an applicator 23, which is embodied such that a quantity of lubricating substance that is still between 0.02 and 0.08 mg per square meter of surface area is deposited on this surface.

In an advantageous embodiment which is shown in FIG. 3, this applicator includes a reservoir 35 copntaining the powdered lubricating substance. This reservoir 35, which is shown in FIG. 3 in a section taken along a plane perpendicular to the axis of rotation 11 of the drum 10 is placed, as FIG. 1 shows, above this drum, between the cleaning device 22 and the erasing device 24. This reservoir 35 is embodied by two plates 36 and 37, of which one, 36, of rectangular shape, is disposed nearly vertically, perpendicular to the plane of the section and in such a manner that its lower edge 38 is spaced apart by 5 to 10 mm from the surface 13 of the drum 10, while the other plate 37, disposed perpendicular to the plane of the section, is inclined with respect to the plate 36; these two plates are joined one to the other by two transverse plates, only one of which, 39, is visible in FIG. 3. These four plates form a dimensionally stable box practically having the shape of a prism the crest of which is turned toward the back. Moreover the plate 37 is adjusted such that on the one hand the distance by which its lower edge 40 is spaced apart from the surface 13 of the drum is substantially the same as that by which this surface is separated from the lower edge 38 of the plate 36, and on the other hand, the spacing between these two lower edges 38 and 40 is equal to a maximum of 5 mm. Under these conditions, the reservoir 35 has a rectangular opening 41 in its lower portion, which being located a slight distance from the surface 13 of the drum extends over a length equal to the length of this drum; the width of this opening is very small in comparison with its length.

The applicator shown in FIG. 3 also includes a plurality of very flexible filaments 42, each of which has one of its ends embedded inside a mass 43 of hardened resin, which in turn is constrained inside a bracket 44 affixed to the inside of the reservoir 35. These filaments 42 have a length such that they pass via the opening 41 of the reservoir 31 and with their other end come into contact with the surface 13 of the drum 10. These filaments, which have a diameter on the order of 0.1 mm, comprise a very flexible natural or synthetic material which when they are suspended by one of their ends enables them to rest nearly in a vertical position or to return to such a position once they have relaxed after having been spaced apart from this position. Accordingly, these filaments may be formed of animal fibers, for example horsehair, carbon fibers, or a flexible filamentary plastic material, such as the polyamide material sold under the name "nylon" (registered trademark). The number N of these filaments 42 is such that the filaments almost completely obstruct the opening 41 of the reservoir 35. More precisely, if Σ stands for the surface area of the cross section formed by this opening in the absence of filaments, and S stands for the total cross- sectional surface of these N filaments (the value of S thus being given by the expression $S=N(\pi d^2/4)$ in which d represents the diameter of each filament), the number N is such that the ratio of S/Σ is between 0.35 and 0.8. As a result, the number N of filaments 42 that partially obstruct the opening 41 of the reservoir 35 is between two limit values $N_m$ and $N_M$, given respectively by the following expressions:

$$N_m = \frac{0.35\Sigma \times 4}{\pi d^2} \text{ and } N_M = \frac{0.8\Sigma \times 4}{\pi d^2}$$

Accordingly, in the case where the opening 41 has a length of 40 cm and a width of 4.5 mm, for example (that is, has a surface area of cross section Σ=1800 mm$^2$ ), and where the diameter d of each filament 42=0.1 mm, these two limit values are respectively equal to the following:

$$N_m = \frac{0.35 \times 1800 \times 4}{\pi X(1/100)} \approx 80{,}250$$

$$N_M = \frac{0.8 \times 1800 \times 4}{\pi X(1/100)} \approx 183{,}400$$

It has been found that when the number N of filaments 42 met the conditions just described above, these filaments prevented the particles of lubricating substance contained in the reservoir 35 from dropping freely onto the surface 13 of the drum, at least as long as this drum was not driven in rotation. Nevertheless, it should be noted that the number N of filaments that pass through the opening 41 allows these filaments to retain a certain freedom of movement, such that when the drum rotates, these filaments, which are in contact with the moving surface of the drum, are set into motion with respect to one another, and thus allow the lubricating particles caught in the tangle of these filaments to slide along them and finally to drop onto the surface of the drum. The quantity of lubricating surface that is thus deposited per unit of surface area on the surface 13 of the drum depends on the number N of filaments 42 that partially obstruct the opening 41 of the reservoir, and this quantity is the higher, the lower the number N of filaments. It has thus been found that in the case where the number of these filaments is equal to the limit value $N_m$ given above, the quantity of lubricating substance that was deposited per square meter on the surface of the drum was practically equal to 0.05 mg, while the case where the number of these filaments was equal to the limit value $N_M$ indicated above, the quantity of lubricating substance deposited per square meter on the drum was practically equal to 0.02 mg. Taking the numerical example given above, it has effectively been possible in this case, with a number of filaments practically equal to 125,000, to deposit a quantity of lubricating substance practically equal to 0.03 mg of each square meter of the surface of the drum.

Given that as has also been indicated above the applicator for the lubricating substance that has just been described is placed between the cleaning device 22 and the erasing device 24, or in other words upstream of this erasing device, the particles that are thus deposited by this applicator on the surface 13 of the drum permit this surface to be lubricated just prior to its passage beneath this erasing device 24 and beneath the recording device 12. With this arrangement, it has been found that even in the case where the mass of lubricating substance deposited per square meter of surface are was low, that is, practically equal to 0.02 mg/m$^2$, the surface of the drum was sufficiently well lubricated to prevent softening of the particles of developer deposited on the surface and hence to avoid the formation of an undesirable covering film on this surface.

In another embodiment, which is shown in FIG. 4, the applicator for lubricating substance includes a chamber 59, which is located above the surface 13 of the drum, and the lower partition of this chamber comprises a small portion 61 of this surface 13, which is in the form of a strip included between two generatrixes of the drum. Thus as seen in FIG. 4, this portion of the surface 61 extends between a retaining element 128, which is placed in contact with the surface 13, and a scraper 57, one edge 58 of which is pressed against this surface 13, the retaining element 128 and the scraper 57 being disposed upstream and downstream, respectively, of the portion of surface 61 with respect to the direction of displacement F of the surface 13 of the drum. The chamber 59 may be made to communicate with the interior of a cartridge 50, cylindrical in shape, which being accommodated in a shell 51 fixed above the chamber 59 is capable of pivoting about its axis 52; this cartridge 50 contains particles of lubricating substance. In its lower portion, the shell 51 is provided with a recess 53 made in such a way as to allow a portion of the cylindrical wall of the cartridge 50 to project outside this shell and thus to act as an upper partition for the chamber 59. It should be noted here that the cartridge 50 and the shell 51 are positioned in such a way with respect to the drum that the axis 52 of the cartridge is parallel to the axis of rotation 11 of this drum, and that the distance the separates this cartridge 50 from the surface portion 61 is very slight compared with the diameter of this cartridge. Under these conditions, the volume of the chamber 59 is notably less than that of the cartridge 50. FIG. 4 also shows that the shell 51 is provided with a relief 54 for the passage of an actuating lever 55 integrally connected to the cartridge 50; this level 55 can be displaced by the operator between two limit positions, the first of which is shown in dot-dash lines in FIG. 4 and the second of which is shown in solid lines in the same figure. The cylindrical wall of the cartridge 50 is pierced by an opening 56 that extends in a direction parallel to the pivot axis 52 of the cartridge and is embodied such that when the actuating lever 55 is placed in its first position, this opening 56 is obturated by the housing wall of the shell in which this cartridge is located, while when the lever 55 is placed in its second position, this opening 56 comes to face the recess 53 of the shell 51 and permits the particles of lubricating substance contained in the cartridge 50 to leave it and thus to drop into the chamber 59. In each chamber, these particles then form a small reserve of particles which is constantly in contact with the surface portion 61 mentioned above. To prevent these particles comprising the reserve from easily escaping from the chamber 59, this chamber, which extends substantially along a direction parallel to the axis of rotation of the drum, is closed at both ends by two lateral plates, which have not been shown in the drawing for the sake of simplification. Furthermore, an elastic pad 60, fixed close to the edge 58 of the scraper 57 and disposed between the scraper and the cartridge 50, guarantees virtually completely tight sealing of the chamber 59. Under these conditions, the particles that have accumulated in the chamber 59 theoretically cannot leave this chamber. Nevertheless, when the drum rotates about its axis in the direction F, these particles are urged for entrainment by being displaced in the direction of the scraper 57, and if this scraper is kept pressed against the surface of the drum with a force of suitable intensity, the value of which will be given below, a very small number of particles will, in the course of each of the rotations of the drum, slide beneath the scraper 57 and thus leave the chamber 59. It can also be noted here that the quantity of lubricating substance that is distributed over a given portion of the surface of the drum, after its passage beneath the applicator shown in FIG. 4, is always very slight, since the scraper 57 is in effect regulated, as will be seen below, in such a way that the quantity of lubricating substance that is deposited per unit of surface area on the drum is on the order of a few hundredths of a milligram per square meter. It has been found, however, that to obtain uniform distribution of these particles of lubricating substance over the surface of the drum, not only must the edge 58 of the scraper that is in contact with this surface be perfectly rectilinear, but also this scraper must form an angle t, the value of which is still between 10° and 30°, with the half-tangent T to this surface at the point of contact 58 and oriented in the direction of displacement of the drum.

Thus as has been mentioned above, the quantity of lubricating substance that is deposited per unit of surface area on the drum 10 depends on the force with which this scraper is pressed against the drum. More precisely, it has been found that when the force P exerted per unit of length on the edge 58 of the scraper in contact with the drum had a value of 12.5 N/dm (Newtons per decameter), the quantity of lubricant deposited per unit of surface area was substantially equal to 0.06 $mg/m^2$. Similarly, when this force P had a value of 7.5 N/dm, the quantity of lubricant that was deposited per unit of surface area was substantially equal to 0.07 $mg/m^2$. Finally, when this force P had a value 2.5 N/dm, the quantity of lubricant that was deposited per unit of surface was substantially equal to 0.08 $mg/m^2$. In the case illustrated by FIG. 4, where the scraper 57 is in the form of a flexible blade including on the one hand a fixed portion intended to allow this blade to be firnly attached to the shell 51 and on the other hand a free portion of length b, of width a and thickness e (this length b corresponding to the length of the edge 58 of the blade), it is known that when this blade is subjected to a flexion such that the edge 58 of the blade is displaced by a distance f with respect to its original position, the force P that is exerted per unit of length on this edge 58 is expressed as follows:

$$P=(Ee^3 f/4a^3)$$

In this equation, E represents the value of the moduleus of elasticity of the material comprising the blade. It is hence clear that if a material having sufficient elastic properties is selected for embodying this blade, the values of the width a, the thickness e and the flexion f which are suitable to adopt to attain a force P of which the value is equal to at least 2.5 N/dm can be determined, this force thus, as indicated above, making it possible to deposit a quantity of lubricant equal to no more than 0.08 $mg/m^2$ onto the surface of the drum.

In practice, arrangements are made so that the amplitude of the flexion f undergone by the flexible blade will be equal to no more than one-half the width a of this blade, this arrangement permitting the flexible blade, when it is made of one of the material typically selected for making elastic blades, to remain in the range of elastic deformation. However, the material used for this flexible blade must not have a very great hardness, so as not to risk deterioration of the surface of the drum against which this blade is applied. It has been fond that in order for the flexible blade to remain within the limit of elastic deformation and ot to cause any degradation in the state of the surface of the drum, the material used for this blade must have a modulus of elasticity E equal at least to 300 $dN/mm^2$ and a hardness Δ (delta) equal to no more than 600 Vickers. Hence this flexible blade may for example be a blade of polyethylene terephthalate, typically known by the name "Mylar" (registered trademark), having a modulus of elasticity practically equal to 480 $dN/mm^2$, the free portion of this blade having a width a practically equal to 8 mm and a thickness e practically equal to 0.2 mm. The force P which is exerted per unit of length on the edge 58 of this blade, when the blade is subjected to a flexion f equal to one-half the width a of the blade, that is, 4 mm in this example, then has the value as follows:

$$P = \frac{480 \times (0.2)^3 \times 4}{4 \times (8)^3} = 7.5 \times 10^{-3}\ dN/mm = 7.5\ N/dm$$

In this case the quantity of lubricating substance deposited per unit of surface area on the drum 10 is substantially equal to 0.07 $mg/m^2$.

The flexible blade may also be a blade of stainless steel, having a modulus of elasticity practically equal to 25,000 $dN/mm^2$, the free portion of this blade having a width a practically equal to 8 mm and a thickness e practically equal to 0.05 mm. The force P which is exerted per unit of length on the edge 58 of this blade, when the blade is subjected to a flexion f equal to one-half the width a of the blade, that is, 4 mm in this example, then has the value as follows:

$$P = \frac{25{,}000 \times (0.05)^3 \times 4}{4 \times (8)^3} = 6.1 \times 10^{-3}\ dN/mm = 6.1\ N/dm$$

In this case the quantity of lubricating substance deposited per unit of surface area on the drum 10 is substantially a equal to 0.073 mg/m$^2$.

To prevent the flexible blade from undergoing overly rapid wear as a consequence of its friction on the surface of the drum, the force with which the blade is applied to this surface must not be excessively high. Tests have shown that to obtain moderate wear of the blade, the force P exerted per unit of length on the edge 58 of this blade must not practically exceed the value of 20 N/dm. Under these conditions, the quantity of lubricating substance that is deposited per unit of surface areas on the drum 10 does not drop below 0.04 mg/m$^2$.

It should also be noted that the retaining element 128 with which the applicator for the lubricating substance that has just been described is equipped is in the form of a pad of very flexible material, for example foam rubber or a textile material.

In a very particularly advantageous embodiment shown in FIG. 4, the cleaning device 22 is disposed in the immediate proximity of the applicator for lubricating substance, upstream of it, and the felt pad with which this cleaning device is equipped is positioned such that for this applicator it then plays the role of a retaining element 128.

Thus as noted above, the lubricating substance embodied in accordance with the invention is deposited on the surface of the drum 10 in such a way that the quantity of substance deposited per square meter of surface area remains between 0.02 mg and 0.08 mg. It has been found that under these conditions the surface of the drum was correctly lubricated, and even in the case where the speed of displacement of this surface attained 1.5 m/s, the heating caused by friction of the recording device and erasing device on this surface was negligible.

Moreover, given that as noted above the magnetic drum is electrically connected to ground and that each of the particles of lubricating substance is coated over its entire external surface with a coat of conductive carbon, the electric charges that these particles can aquire as a consequence of friction upon their passage beneath the erasing device or the recording device, for example, are systematically eliminated. Because of this, these lubricating particles, which are distributed uniformly over the surface of the drum, do not threaten to electrostatically attract the particles of the developer upon their travel past the developer applicator device 16, thus preventing the formation on the sheet of paper 20 of a film prejudicial to good printing quality.

It will be understood that the invention is in no way limited to the embodiments described and shown herein, which are given solely by way of example. On the contrary, they include all the means comprising technical equivalents of those described and illustrated, whether considered in isolation or in combination and applied within the scope of the following claims.

What is claimed is:

1. A powdered lubricating substance capable of being applied to the external surface (13) of a recording carrier (10) of a magnetic printer, said substance comprising particles (30) of a powdered insulating material capable of reducing friction between said surface (13) and a recording device (12) mapplied to this surface, this substance being characterized in that it further contains particles (31) of conductive carbon which are disposed about said insulating particles (30) to form groups (G) of lubricating particles, the ratio of the total mass of carbon to that of said insulating material being included between 0.2 and 1.

2. A powdered lubricating substance as defined by claim 1, characterized in that said conductive carbon particles (31) completely surround each of said insulating particles (30).

3. A powdered lubricating substance as defined by claim 1, characterized in that the size of each of the carbon particles (31) is approximately 100 times smaller than that of the particles of insulating material (30).

4. A powdered lubricating substance as defined by claim 2, characterized in that the size of each of the carbon particles (31) is approximately 100 times smaller than that of the particles of insulating material (30).

5. A powdered lubricating substance as defined by claim 1, characterized in that each particle of insulating material (30) has a size on the order of 1 $\mu$m.

6. A powdered lubricating substance as defined by claim 2, characterized in that each particle of insulating material (30) has a size on the order of 1 $\mu$m.

7. A powdered lubricating substance as defined by claim 3, characterized in that each particle of insulating material (30) has a size on the order of 1 $\mu$m.

8. A powdered lubricating substance as defined by claim 4, characterized in that each particle of insulating material (30) has a size on the order of 1 $\mu$m.

9. A device capable of applying a powdered lubricating substance onto the external surface of the recording carrier of a magnetic printer, this device being characterized in that it includes:

a reservoir (35) containing said powdered substance and having an opening (41) in its lower portion arranged such as to permit all the points of this surface to pass beneath said opening upon the driving of the carrier;

and a plurality of highly flexible filaments (42) passing via this opening to come into contact with said external surface, the number of these filaments being sufficient to cause a quasi-obstruction of said opening, such that in the course of displacement of the recording carrier, these filaments are set into motion with respect to one another and allow the particles of lubricant caught in the tangle of these filaments to slide along these filaments and drop onto said surface.

10. A device as defined by claim 9, characterized in that the number N of filaments (42) is included between 2 limit values $N_m$ and $N_M$, given respectively by the following equations:

$$N_m = \frac{0.35\Sigma \times 4}{\pi d^2}$$

$$N_M = \frac{0.8\Sigma \times 4}{\pi d^2}$$

in which $\Sigma$ represents the value of the surfaced area of the cross section of the opening (41), and d represents the value of the diameter of each of said filaments.

11. A device capable of applying a powdered lubricating substance onto the external surface of the recording carrier of a magnetic printer, this device being characterized in that it includes a chamber (59) containing said powdered substance, this chamber being placed above said external surface and being limited in its lower portion by a portion (61) of said external surface, this portion (61) extending between a retaining element (128) place in contact with said surface and a scraper (57), one edge (58) of which is pressed against said surface, this retaining element and this scraper being disposed respectively upstream and downstream of said portion of the surface (61) with respect to the direction of displacement (F) of said recording carrier, said scraper (57) forming and angle (t), the value of which is included between 10° and 30°, with the halftangent (T) to said external surface, passing via the point of contact of this scraper with this surface and oriented in said direction of displacement (F).

12. A device as defined by claim 11, characterized in that force (P) exerted per unit of length on the edge (58) of the scraper which is in contact with the surface of the recording carrier is adjusted in such a manner that the quantity of lubricating surface that passes beneath the scraper and is thus deposited on this surface remains included between 0.04 and 0.08 mg/m$^2$.

13. A device as defined by claim 11, characterized in that the scraper (57) comprises a flexible blade, made of a material having a modulus of elasticity equal to at least 300 dN/mm$^2$ and a hardness equal to no more than 600 Vickers.

14. A device as defined by claim 12, characterized in that the scraper (57) comprises a flexible blade, made of a material having a modulus of elasticity equal to at least 300 dN/mm$^2$ and a hardness equal to no more than 600 Vickers.

15. A magnetographic printing machine, characterized in that it includes an applicator device for powdered lubricating substance as defined by claim 9.

16. A magnetographic printing machine, characterized in that it includes an applicator device for powdered lubricating substance as defined by claim 10.

17. A magnetographic printing machine, characterized in that it includes an applicator device for powdered lubricating substance as defined by claim 11.

18. A magnetographic printing machine, characterized in that it includes an applicator device for powdered lubricating substance as defined by claim 12.

19. A magnetographic printing machine, characterized in that it includes an applicator device for powdered lubricating substance as defined by claim 13.

20. A magnetographic printing machine, characterized in that it includes an applicator device for powdered lubricating substance as defined by claim 14.

21. A magnetographic printing machine, characterized in that its recording carrier is lubricated with the aid of the powdered lubricating substance defined by claim 1.

22. A magnetographic printing machine, characterized in that its recording carrier is lubricated with the aid of the powdered lubricating substance defined by claim 2.

23. A magnetographic printing machine, characterized in that its recording carrier is lubricated with the aid of the powdered lubricating substance defined by claim 3.

24. A magnetographic printing machine, characterized in that its recording carrier is lubriated with the aid of the powdered lubricating substance defined by claim 4.

25. A magnetographic printing machine, characterized in that its recording carrier is lubricated with the aid of the powdered lubricating substance defined by claim 5.

26. A magnetographic printing machine characterized in that its recording carrier is lubricated with the aid of the powdered lubricating substance defined by claim 6.

27. A magnetographic printing machine, characterized in that its recording carrier is lubricating with the aid of the powdered lubricating substance defined by claim 7.

28. A magnetographic printing machine characterized in that its recording carrier is lubricated with the aid of the powdered lubricating substance defined by claim 8.

* * * * *

UNITED STATES PATENT AND TRADEMARK OFFICE
CERTIFICATE OF CORRECTION

PATENT NO. : 4,831,386

DATED : May 16, 1989

INVENTOR(S) : CHERBUY et al

It is certified that error appears in the above-identified patent and that said Letters Patent is hereby corrected as shown below:

On cover page, item [54], "or" should be --of--.

In Col. 13, line 4, (Claim 11, line 9), "place" should be --placed--.

In Col. 14, line 23, (Claim 24, line 2), "lubriated" should be --lubricated--.

Signed and Sealed this

Twenty-seventh Day of February, 1990

*Attest:*

JEFFREY M. SAMUELS

*Attesting Officer* *Acting Commissioner of Patents and Trademarks*